United States Patent [19]

Kehr

[11] 4,060,282
[45] Nov. 29, 1977

[54] HYDROSEPARATOR STACKER

[76] Inventor: Edwin A. Kehr, 260 W. Van Fleet, Apt. 29, Bartow, Fla. 33830

[21] Appl. No.: 653,389

[22] Filed: Jan. 29, 1976

[51] Int. Cl.² .............................................. B65G 53/30
[52] U.S. Cl. ...................................... 302/16; 137/615;
210/241; 214/10; 302/14
[58] Field of Search ....................... 302/14, 16, 34, 61,
302/33; 210/241; 137/615; 214/10, 15 B

[56] References Cited

U.S. PATENT DOCUMENTS

| 808,800 | 1/1906 | Wright | 302/14 |
|---|---|---|---|
| 2,631,899 | 3/1953 | Jullien | 302/14 |
| 2,828,164 | 3/1958 | Spence | 302/16 |
| 3,382,011 | 5/1968 | Mascarello et al. | 302/14 |
| 3,604,757 | 9/1971 | White | 214/10 |
| 3,661,283 | 5/1972 | Fischer et al. | 214/10 |
| 3,675,680 | 7/1972 | Frohlich et al. | 137/615 |

Primary Examiner—John J. Love
Assistant Examiner—Jeffrey V. Nase
Attorney, Agent, or Firm—Duckworth, Hobby & Allen

[57] ABSTRACT

An apparatus for transporting a slurry composed of a solid suspended in a liquid, for separating the solid from the liquid, and for discharging the solid onto a mound for storage. The hydroseparating stacker includes a separator for removing a portion of the liquid from the slurry and leaving a slurry concentrate. The separator is supported by a boom which includes a first hollow support element operably coupled to the separator for transporting the slurry thereto. The boom also includes a second hollow support element operably coupled to the separator for removing the excess liquid therefrom. The separator and the boom are movably suspended superadjacent to the mound for depositing the slurry concentrate discharged from the separator onto the mound for storage.

12 Claims, 3 Drawing Figures

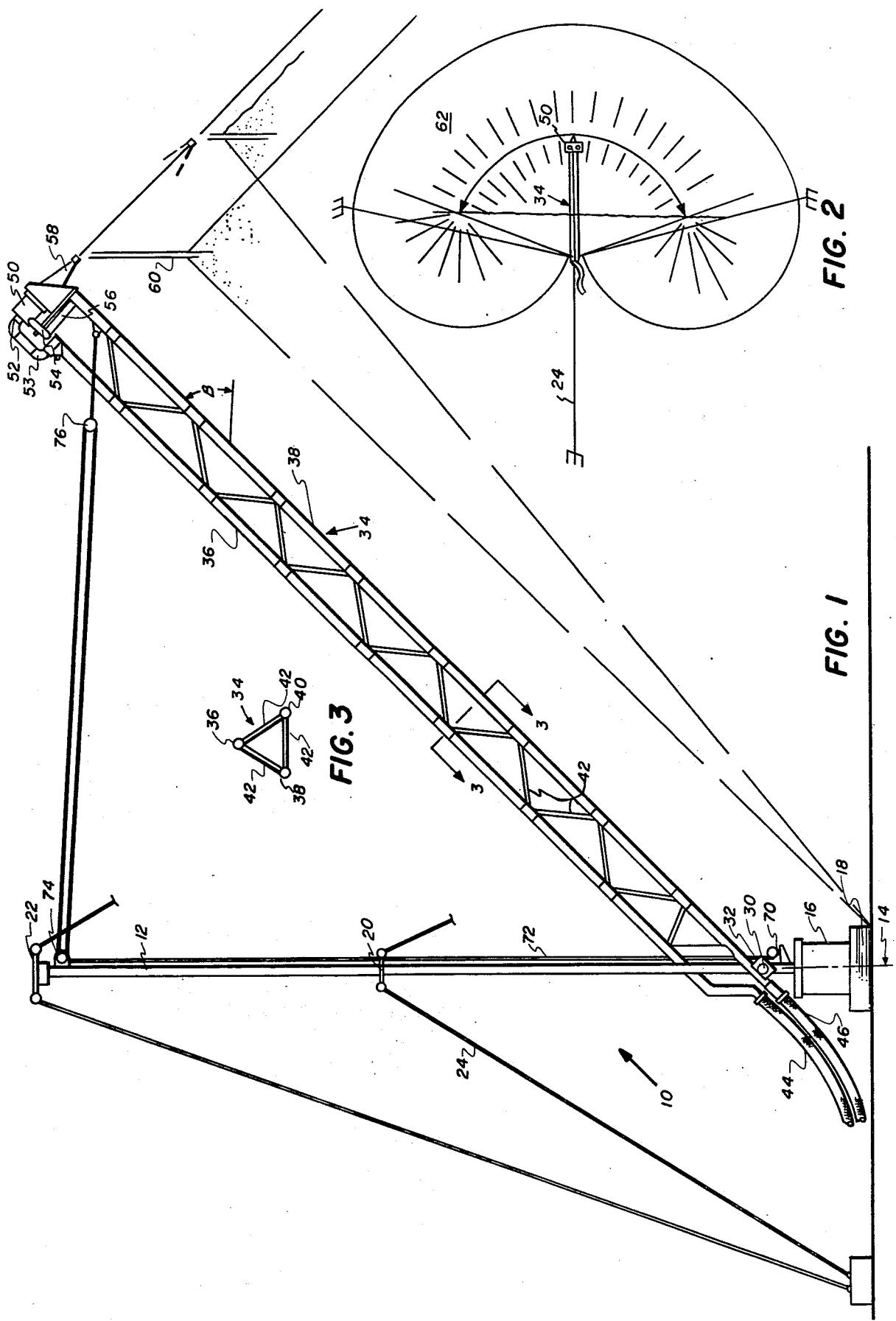

HYDROSEPARATOR STACKER

BACKGROUND OF THE INVENTION

1. Field of the Invention

This invention relates to a system for storing and drying a mixture comprising a solid and a liquid. In particular, this invention relates to a system for transporting a slurry, separating a portion of the liquid from the slurry, and distributing the remaining slurry concentrate to a semi-circular pile for subsequent liquid evaporation.

2. Description of the Prior Art

Mining operations for solid materials such as phosphates, coal and sand are increasingly employing transportation systems whereby the mined solid is suspended in a fluid, thus producing a slurry. In some circumstances the slurry is produced to facilitate the transportation of the solid material, whereas in other circumstances the mining operation recovers the solid material already suspended in a liquid. In either case, the slurry is easily pumped through ordinary pipes for subsequent distribution and storage. The normal method involves the storage of the slurry in a large pool which allows the radiant energy of the sun to evaporate the liquid, thereby leaving the dried solid material. The solid material must then be removed from the evaporating pools and transported to a storage area. This system requires extra machinery to remove the solid material from the evaporating pools and to transport the solid material to the storage area. Furthermore, during the transportation of the material to the storage area and during the period of storage, a significant portion of the stored dried material is lost due to wind erosion and scattering.

The present invention avoids many of these problems by eliminating the remotely located intermediate evporating step. According to the present invention the slurry containing the solid material is pumped directly to the storage area whereupon it passes through the support arms of an elevated boom to a separator which is mounted at the distended end of the boom. Prior to entering the separator the slurry consists of from 0 to 35 percent solids by weight. A separator, such as hydrocyclone separator, is capable of separating solid material larger than 200 mesh from the slurry, thus yielding a slurry concentrate having from 70 to 80 percent solids. This slurry concentrate is then expelled from the separator and stored in piles for drying. The elevated boom is pivotally mounted at its base allowing the separator to sweep an arc of a semi-circle, thereby producing a storage pile having a much greater length and concommitant storage volume than the ordinary pole mounted separator. The relatively high solid content of the concentrated slurry discharged from the hydrocyclone separator allows the solid material to be stored in piles having an angle of repose approaching 45 degrees without excessive flushing due to excessive liquid content. Furthermore, the transportation and storage of the solid material in a slurry drastically reduces the losses of the solid material during transportation. Also, the storage of the solid material in a slurry initially reduces the erosion losses since subsequent slurry depositions cover and re-wet the drying solid material.

THE DRAWINGS

FIG. 1 is a frontal elevation of the hydroseparating stacker.

FIG. 2 is a top plan view of the hydroseparating stacker illustrating the arc-shaped mound deposited thereby.

FIG. 3 is a cross-section view taken along the lines 3—3 as shown in FIG. 1.

DETAILED DESCRIPTION OF THE PREFERRED EMBODIMENT

A hydroseparating stacker generally shown as 10 in FIG. 1 includes a generally cylindrical vertical support shaft 12 having a vertical pivot axis 14 coaxially therethrough. The vertical support 12 is concentrically coupled at its base to a drive motor 16 for rotating the vertical support 12 about the vertical pivot axis 14. The drive motor 16 is coupled to a base 18. The vertical support 12 rotates within two thrust bearing collars 20 and 22 which are secured by a plurality of guy wires 24. The vertical support 12 also includes at its base a horizontal pivot shaft 30 which is coupled by a plurality of bearings (not shown) to a pivot plate 32.

The pivot plate 32 couples a boom, shown generally as 34 in FIG. 1, to the horizontal pivot shaft 30. As shown in FIGS. 1 and 3, the boom 34 includes a first hollow support element 36, a second hollow support element 38 and a third support element 40. The first, second and third support elements 36, 38 and 40 are retained parallel to each other and in a triangular orientation by a plurality of truss elements 42. The first hollow support element 36 is coupled at its base end to a slurry input line 44 which transports the slurry therethrough. The first hollow support element 36 is then coupled through a coupling pipe 53 into the input 52 of a hydroseparator 50 mounted at the distended end of the boom 34. A second coupling pipe 56 couples the bypass liquid from an output 54 of the hydroseparator 50 to the second hollow support element 38. A bypass liquid discharge line 46 is coupled to the base end of the second hollow support element 38 for removing the bypass liquid therefrom. The base end of the second hollow support element 38 is coupled to the pivot plate 32 for allowing the boom 34 to rotate about the horizontal pivot shaft 30.

The separator 50, also known as a hydroseparator or a hydrocyclonic separator, accepts a slurry input and by spinning the slurry about a vortex separates the liquid from the solid matter suspended therein. The bypassed liquid is discharged from the output 54 while the solid matter or slurry concentrate 60 is ejected therefrom through a solid matter output port 58. The solid matter or slurry concentrate 60 accumulates in a generally pyramid shaped mound or pile 62. A typical hydrocyclonic separator 50 of the type specified herein is model 624 manufactured by the Linatex Corporation of America, Stafford Springs, Connecticut 06076, or its equivalent.

A power winch 70 is coupled to the base of the vertical support 12 for controlling the length of a line 72 which is attached thereto. The line 72 communicates through a pulley 74 at the distended end of the vertical support shaft 12, through another pulley and linkage element 76 which is coupled to the distended end of the boom 34, and is then secured to the distended end of the vertical support shaft 12 adjacent to the pulley 74.

The operation of the hydroseparating stacker 10 will now be described with reference to FIG. 1. A 4 mesh by 200 mesh slurry consisting of approximately 0 to 35 percent solids by weight is pumped through the slurry input line 44, through the first hollow support element 36 and the pipe 53 to the input 52 of the hydroseparator 50. The hydroseparator 50 separates the solid material, such as sand, from the liquid carrier, such as water. The nearly solid free bypass liquid is returned through the second hollow support element 38 and the bypass liquid discharge line 46 to other parts of the system for subsequent re-use. The slurry concentrate 60 is discharged from the solid matter output 58 of the separator 50. The slurry concentrate is approximately 70 to 80 percent solid by weight, with the remaining proportion consisting of the liquid carrier. The slurry concentrate 60 accumulates, thereby forming a mound 62 of solid material. Due to the low liquid content of the slurry concentrate, there is very little flushing down of the solid material from the crest of the mound 62. The high solid density of the slurry concentrate discharge thereby allows the mound 62 to build up to a high angle of repose, which in some cases approaches 45 degrees.

The drive motor 16 allows the vertical support 12 to be rotated about the vertical pivot axis 14, thereby causing the boom 34 and the separator 50 to sweep the arc of a circle having its center coincident with the vertical pivot axis 14 and a radius equal to the perpendicular distance measured between the vertical support 12 and the separator 50. Thus, the rotation of the vertical support 12 allows the slurry concentrate 60 to be discharged in a semi-circular arc, thereby forming an arc-shaped mound 62 as shown in FIG. 2. After the slurry concentrate 60 has been deposited in the arc-shaped mound 62, the remaining liquid will evaporate therefrom leaving behind the solid material stacked in the arc-shaped mound 62. The semi-circular shape of the mound 62 allows a much larger volume of a solid material to be stored in close proximity to a single stacker than is otherwise possible. One method of building the arc-shaped mound 62 would be to lower the boom 34 to its lowest boom angle $\alpha$ (Alpha), as shown in FIG. 1, and then to deposit the solid material 60 in an arc-shaped mound 62 by rotating the boom 34 and the vertical support 12 about the vertical pivot axis 14 by means of the drive motor 16. In this manner an arc-shaped mound spanning approximately 140 degreees may be constructed. Next, the boom 34 is raised to a larger boom angle $\beta$ (Beta) by activating the power winch 70. The drive motor 16 is then reversed to drive the boom 34 and the separator 50 in a direction opposite from the initial sweep. This second sweep of the separator 50 will deposit another layer of slurry concentrate 60 upon the mound 62 and thus increase the angle of repose. By alternating the sweep of the boom 34 about the vertical pivot axis 14 with the rotation of the boom 34 about the horizontal pivot shaft 30, an arc-shaped mound 62 can be constructed having an angle of repose approaching 45 degrees. Of course, it would then be possible to move the hydroseparating stacker 10 to a different base 18 in a different location to begin again the process of building a new arc-shaped mound 62.

It will be clear at this point that a hydroseparating stacker has been provided which overcomes some of the problems of prior stackers. However, the invention is not to be construed as limited to the particular forms disclosed herein since these embodiments are to be regarded as illustrative rather than restrictive.

I claim:

1. An apparatus for movably supporting a separator of the type which accepts an input slurry comprising a solid suspended in a liquid and removes a portion of the liquid therefrom to produce a slurry concentrate, said movable separator support comprising:
    a vertical support having a vertical pivot axis therethrough;
    a boom movably coupled to said vertical support, said boom having said separator attached thereto, said boom defined by a plurality of support elements including a first hollow support element operably coupled between a source of said slurry and an input of said separator for transporting said slurry thereto, said boom further including a second hollow support element operably coupled to said separator for removing said portion of said liquid therefrom, and said boom including a third support element connected to said first and second support elements and positioned substantially parallel thereto along the length of said boom, said first, second and third support elements disposed to define said boom as having a generally triangular cross-section.

2. The apparatus as described in claim 1 wherein said boom is rotatably coupled to said vertical support about a horizontal pivot attached thereto.

3. The apparatus as described in claim 2 further including positioning means for rotating said boom about said horizontal pivot, whereby the radius of said arc-shaped mound is varied.

4. The apparatus as described in claim 3 wherein said separator is attached to said boom adjacent a distended end thereof.

5. The apparatus as described in claim 4 wherein said positioning means includes a line coupled between a distended end of said vertical support and said distended end of said boom, said means for lengthening and shortening said line, whereby the included angle between said vertical support and said boom is varied.

6. An apparatus for transporting a slurry composed of a solid suspended in a liquid, and for discharging the solid onto a mound for storage, said apparatus comprising:
    a separator for removing a portion of said liquid from said slurry leaving a slurry concentrate;
    a boom for supporting said separator, said boom at least partially defined by a plurality of support elements, said plurality of support elements including a first hollow support element operably coupled to said separator for transporting said slurry thereto, said boom further including a second hollow support element operably coupled to said separator for removing said portion of said liquid therefrom, and said boom further including a third support element connected to said first and second support elements and positioned substantially parallel thereto along the length of said boom, said first, second and third support elements disposed to define said boom as having a generally triangular cross-section; and
    suspension means for movably suspending said boom and said separator supradjacent to the mound, whereby said slurry concentrate containing said solid may be discharged from said separator onto the mound for storage.

7. The apparatus as described in claim 6 wherein said separator is supported adjacent to a distended end of said boom.

8. The apparatus as described in claim 6 wherein said suspension means for said boom comprises means for rotating said boom about a vertical pivot axis spaced from said separator along said boom, whereby said boom and said separator sweep an arc of a circle for forming an arc-shaped mound of said solid.

9. The apparatus as described in claim 8 wherein said suspension means for said boom comprises a vertical support having a horizontal pivot thereon for rotatably coupling said boom thereto, said rotating means disposed to rotate said vertical support about said vertical pivot axis.

10. The apparatus as described in claim 9 wherein said vertical support is generally coincident with said vertical pivot axis.

11. The apparatus as described in claim 9 wherein said suspension means further comprises means for varying the radius of said arc-shaped mound.

12. The apparatus as described in claim 11 wherein said radius varying means comprises means for rotating said boom about said horizontal pivot, whereby the elevation of said separator and said boom are varied.

* * * * *